United States Patent [19]

Katakura

[11] Patent Number: 5,414,575
[45] Date of Patent: May 9, 1995

[54] MAGNETIC DISC DRIVE DEVICE WITH HUB AND CLAMPER ASSEMBLY FOR REDUCING POST-ASSEMBLY MACHINING

[75] Inventor: Koichi Katakura, Nagano, Japan

[73] Assignee: Kabushiki Kaisha Sankyo Seiki Seisakusho, Nagano, Japan

[21] Appl. No.: 132,681

[22] Filed: Oct. 7, 1993

[30] Foreign Application Priority Data

Oct. 8, 1992 [JP] Japan .................. 4-76919 U

[51] Int. Cl.⁶ .................................. G11B 17/02
[52] U.S. Cl. ...................................... 360/98.08
[58] Field of Search ............... 360/99.12, 99.08, 98.08; 369/270, 271

[56] References Cited

U.S. PATENT DOCUMENTS 4,775,906 10/1988 Suzuki et al. .................. 360/98.08
5,214,326 5/1993 Yonei ............................. 360/98.08

Primary Examiner—Robert S. Tupper
Attorney, Agent, or Firm—Sughrue, Mion, Zinn, Macpeak & Seas

[57] ABSTRACT

A magnetic disc drive device contains a cylindrical hub integrally rotating with a magnetic disc, the cylindrical hub having disc clamp holes defined in an end surface thereof; a motor for rotating the cylindrical hub; and a projecting member formed between the disc clamp hole and the magnetic disc to be clamped in such a manner that the projecting member is extended in the axis direction of the hub on said end surface of the hub.

4 Claims, 2 Drawing Sheets

MAGNETIC DISC DRIVE DEVICE WITH HUB AND CLAMPER ASSEMBLY FOR REDUCING POST-ASSEMBLY MACHINING

BACKGROUND OF THE INVENTION

1. Field of the Invention

This invention relates to a magnetic disc drive device, and more particularly to the construction of a hub for clamping and rotating a magnetic disc.

2. Related Art

An example of a conventional magnetic disc drive device, in this case a hard disc drive device, is shown in FIG. 3. In FIG. 3, a cylindrical bearing holder 62 is mounted, for example, by press fitting in a boss formed in the center of a frame 60. A shaft 68 is rotatably mounted between lower and upper bearings 66, 66 inside the bearing holder 62. The shaft 68 is fixed in a hole in the center of the base of a cylindrical hub 70, for example, by press fitting whereby the hub 70 is supported in such a manner that the hub 70 can rotate integrally with the shaft 68. The purpose of the hub 70 is to hold a number of magnetic discs 82 which are integrally clamped to rotate together with the hub. The hub has at one end (the lower end in the drawing) a peripheral flange 72 for holding the magnetic discs 82 and has at the other end a number of threaded disc clamp holes 75. A suitable number of magnetic discs 82 are laminated with a suitable number of spacers in such a manner that the spacer is interposed between the magnetic discs 82. A clamper 84 is mounted on top of this stack, and the magnetic discs 82 are clamped to the hub 70 by fixing screws 86 which pass through the clamper 84 and are screwed into the threaded disc clamp holes 75.

A cylindrical drive magnet 76 is magnetized so that a different pole appears alternately in the circumferential direction and is fixed to the inner surface of the hub 70. A stator core 78 is fitted on the outer surface of the shaft holder 62. The stator core 78 has a plurality of salient poles. These salient poles 78 face the inner surface of the drive magnet 76, and a coil 80 is wound around each salient pole.

The drive magnet 76 and the parts which are integral with it make up the rotor of a disc drive motor, and the stator core 78 and the coils 80 make up the stator of this motor.

With this kind of disc drive device, vibration of the hub 70 during rotation is a problem. In particular, as advances are made in high-densification of recorded data, it is essential that the magnitude of the vibrations of the hub 70 in the radial and axial directions be reduced. In order to achieve this requirement, not only is it essential that each individual part be manufactured with a high degree of precision, but also post-assembly machining, in which the surface of the hub 70 is machined after the disc drive device has been assembled, is increasingly becoming necessary.

In post-assembly machining, while the hub 70 is rotated about its own axis, first the upper surface of the flange 72, on which the discs are mounted, is machined, and then the upper end surface of the hub 70 and then the outer surface 73 are machined, as shown in FIG. 4. Because the clamping force exerted by the clamper 84 on the magnetic discs 82 depends upon the height of the outer surface 73, i.e. the height dimension "H" between the upper surface of the flange 72 and the upper end surface of the hub 70, it is necessary to keep variations of the height dimension in a predetermined error range (for example to below ±0.05 mm). This is another reason why post-assembly processing is necessary.

In a conventional magnetic disc drive device, the whole upper end surface of the hub 70 is flat, and this whole flat surface has to be post-assembly machined. Therefore, it is necessary to machine the areas around the threaded disc clamp holes 75, because the threaded disc clamp holes 75 are formed in the upper end surface of the hub 70. The waste generated by the post-assembly machining enter the threaded disc clamp holes 75 and enter the motor section containing the stator core 78 and the drive magnet 76, etc. The waste can also get scattered over the magnetic discs 82 on the outside of the hub 70.

Also, in the post-assembly machining process, an axial screw hole 69 is provided in the bottom end of the shaft 68, and a male screw portion 92 of a post-assembly machining boss 90 is screwed into the axial screw hole 69 to couple the post-assembly machining boss 90 with the shaft 68. Thus, the pins 98 of a rotating member 96 are fitted into holes 94 formed in the boss 90 so that the shaft 68 and the hub 70 are rotated together with the rotating member 96. However, there has been the problem of this the post-assembly machining operation entailing a lot of work.

SUMMARY OF THE INVENTION

In view of the foregoing problems, an object of the present invention is to provide a magnetic disc drive with which it is not necessary to carry out post-assembly machining on the area around the disc clamp holes so that waste created during post-assembly machining does not readily enter the magnetic disc clamp holes and with which it is possible to use the magnetic disc clamp holes for rotating the hub during post-assembly so that the post-assembly machining operation can be simplified.

According to an aspect of the present invention, there is provided a magnetic disc drive device comprising: a cylindrical hub integrally rotating with magnetic discs, the cylindrical hub having disc clamp holes defined in an end surface thereof; a motor for rotating the cylindrical hub; and a projecting member formed between the disc clamp holes and the magnetic discs to be clamped in such a manner that the projecting member is extended in the axis direction of the hub on said end surface of the hub.

According to the present invention, because a projecting portion which projects axially from the surface of the hub is formed in the end surface of the hub around the outside of magnetic disc clamp holes formed in the hub, when post-assembly machining is carried out, only the projecting portion of the end surface of the hub needs to be machined. It is thus not necessary to machine the area around the magnetic disc clamping holes. As a result, waste produced during machining does not readily enter the magnetic disc clamping holes, and problems such as waste later getting into the motor section or getting scattered over the magnetic discs are alleviated.

According to the present invention, during post-assembly machining, because it is only necessary to machine the projecting portion formed on the end surface of the hub on the outer side of the threaded magnetic disc clamp holes, post-assembly machining can be carried out with the hub being rotated with the pins of a rotating member inserted into the threaded magnetic disc clamp holes. It is not necessary to fit a boss for post-assembly machining, as is done conventionally, and the post-assembly machining operation can be simplified.

DETAILED DESCRIPTION OF THE PREFERRED EMBODIMENTS

A preferred embodiment will now be described with reference to the accompanying drawings.

Figure 1:
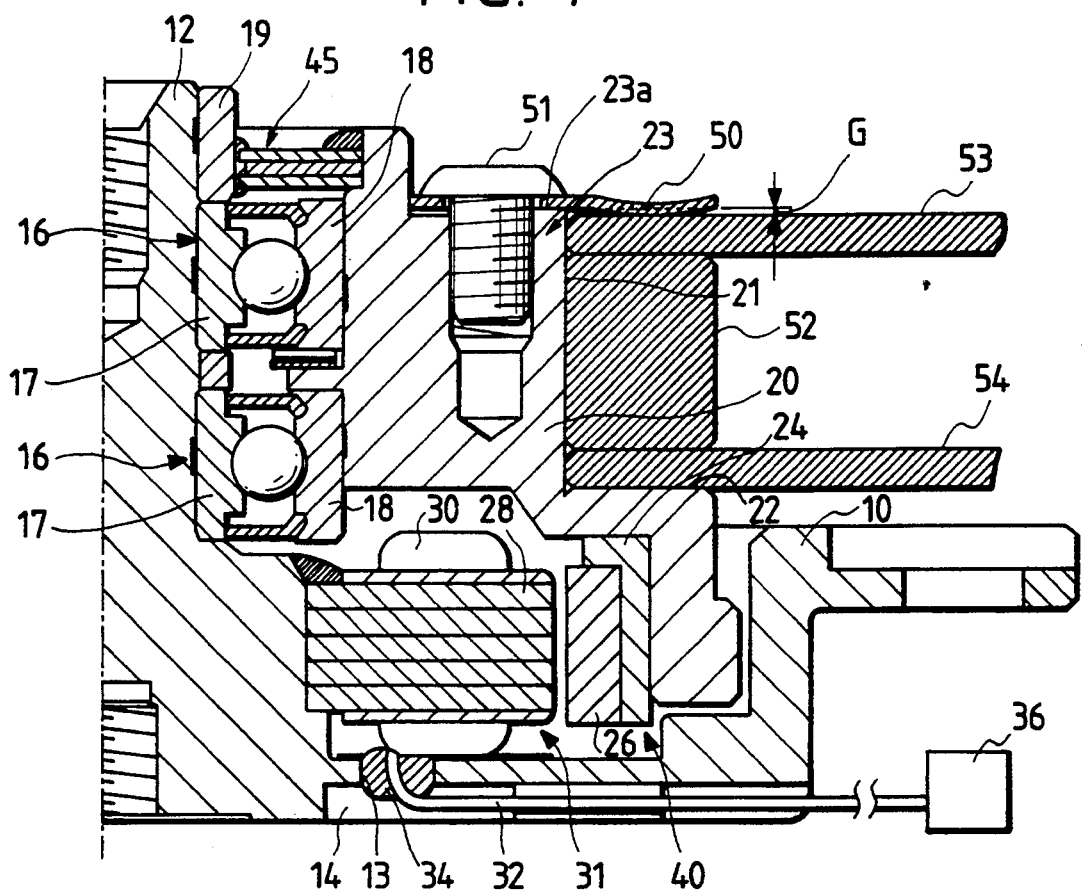
FIG. 1 is a cross-sectional view of a magnetic disc drive device in accordance with the present invention.

In FIG. 1, a frame 10 consists of a shaft 12 positioned in the center of a dish-shaped portion of the frame. The shaft 12 has a large diameter in the lower portion and a small diameter in the upper portion. Upper and lower ball bearings 16 are mounted between an upper portion of the shaft 12 and the hub 20 in such a manner that their inner races 17 are fitted to an outer peripheral portion of an upper portion of the shaft 12 and their outer races 18 are fitted to an inner peripheral portion of the hub 20 so that the hub is rotatably supported on the shaft 12. The hub 20 integrally holds the magnetic disks 53 and 54 to rotate them. The hub 20 has a step portion 22 for holding the discs 53 and 54 at the outer periphery portion thereof and also has a number of threaded disc clamp holes 25 in its top end. The magnetic discs are mounted on the step portion 22 with a suitable spacer 52 interposed between them. A clamper 50 is mounted on top of the disc stack, and the magnetic discs 53 and 54 are clamped onto the hub 20 by fixing screws 51 which pass through the clamper 50 and are screwed into the threaded magnetic disc clamp holes 25.

The threaded magnetic disc clamp holes 25 each extend from the top surface of the hub 20 to a point inside the body of the hub 20; they are blind holes which are not open at the bottom. However, the threaded magnetic disc clamp holes are not limited by the blind holes described above and can be through holes instead.

As shown in FIG. 1, the portion of the hub 20 that is below the step portion 22 is of large diameter and is positioned inside the periphery of the concave portion of the dish-shaped portion of the frame 10, and a ring-shaped drive magnet 26 is mounted on a yoke 24 which is mounted on the inner surface of the portion of the hub 20 that is below the step 22. The drive magnet 26 is magnetized such that a different pole alternatively appears in the circumferential direction. A stator core 28 is mounted on the large diameter lower portion of the shaft 12 of the frame 10. The stator 28 has a number of salient poles. These salient poles face the inner surface of the drive magnet 26, and a coil 30 is wound around each of the salient poles. The drive magnet 26 and the other parts integral with it serve as the rotor of a motor section 40. The stator 28 and the coils 30 make up the stator 31 of the motor section 40. The motor section 40 is mounted inside the hub 20.

A recess portion 40 is formed in the bottom of the concave portion of the dish-shaped portion of the frame 10, and a hole 13 is provided in the floor of this concave portion. A number of lead wires 32 are connected to the ends of the windings of the coils 30, and the lead wires 32 pass through the hole 13 to the outside of the device. The hole 13 is sealed with a sealant 34, and the lead wires 32 are run out along a groove 14 and are connected to a connector 36. A magnetic fluid sealing mechanism 45, which prevents oil, mist, and filings, etc. from the ball bearings 16 from getting out onto the magnetic discs, is provided at the top end of the hub 20. The frame 10 and the shaft 12, are usually made of aluminum so that a ring 19 made of a magnetic material is mounted on the upper end of the shaft 12 in order for the magnetic fluid sealing mechanism 45 to function effectively.

As described above, the magnetic discs 53 and 54, mounted on the step portion with the spacer 52 interposed between them, are clamped to the hub 20 by the fixing screws 51 which pass through the clamper 50 and are screwed into the threaded magnetic disc clamp holes 25. However, as shown in FIG. 1, a projecting portion 23, which projects axially upward from the upper end surface of the hub 20, is formed on the outer side of the disc clamp screw holes 25. The projecting portion 23 forms the datum clamp face on which the clamper is fitted and runs all the way around the edge of the upper end surface of the hub 20.

The size of the clamping force on the magnetic discs 53 and 54 is determined by the gap G shown in FIG. 1. This gap G is defined by: (the height of the outer surface 21 of the hub 20, i.e. the distance from the upper surface of the flange 22 to the datum clamp face 23a of the projecting portion 23)—(the thickness of the magnetic discs 53 and 54 and the thickness of the spacer 52).

Variations in the clamping force determined by this gap G cause deflection in the hub 20, cause distortion in the magnetic discs 53 and 54, and affect the heads (not shown) which follow the magnetic discs 53 and 54. When the distortion of the discs exceeds the adjustment range of the heads, adjustment of the heads becomes impossible and the device becomes useless.

For this reason, the gap G is strictly checked.

The relationship between the gap G and the clamping force on the magnetic discs 53 and 54 follows.

In this preferred embodiment, the clamping force is assumed to be generated by deflection of the clamper 50. This deflection is assumed proportional to the spring force.

In general, a spring force F is given by, $$F = K \times \Delta L$$

K: spring coefficient (determined by spring material, etc.)

ΔL: spring extension (free length—length of spring when load is applied)
(free length=length of spring when there is no load on it)

In this preferred embodiment,

F: clamping force

K: constant (the material and shape of the clamper 50 are constant)

ΔL: (free length (height) of clamper 50—gap G).

The clamping force can thus be controlled by controlling the gap G.

Electric current is supplied from an outside circuit to the coils 30 of the different phases via the connector 36 and the lead wires 32. By switching the current to the coils 30 of the different phases according to the angular position of the drive magnet 26 of the rotor of the motor, the drive magnet 26 and the hub 20 are rotated, and the magnetic discs (not shown) rotate together with the hub 20.

Figure 2:
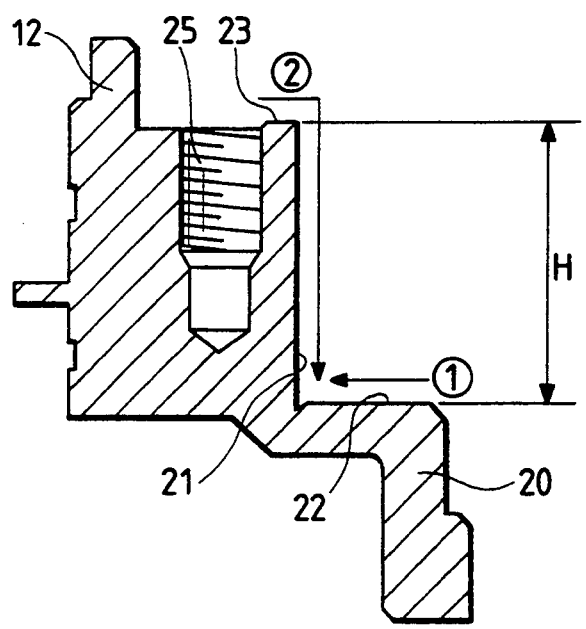
FIG. 2 is a cross-sectional view of the preferred embodiment of FIG. 1.

The magnetic disc drive device of the preferred embodiment described above is post-assembly machined as shown in FIG. 2. First, the magnetic disc holding surface of the flange 22 of the hub 20 is machined, then the upper end surface and then the outer surface of the hub 20 are machined in succession. Because, as described above, the projecting portion 23 forms the datum clamp face on which the clamper 50 is mounted, it is only necessary to machine the projecting portion 23 of the upper end surface of the hub 20, and it is not necessary to machine the area around the magnetic disc clamping screw holes 25. Therefore, chips produced during machining do not readily enter the magnetic clamping screw holes 25, and problems such as chips later getting into the motor section 40 and getting scattered over the magnetic discs are alleviated.

During post-assembiy machining, because it is only necessary to machine the projecting portion 23 formed on the end surface of the hub on the outer side of the threaded magnetic disc clamp holes 25, post-assembly machining can be carried out with the hub 20 being rotated with the pins of a rotating member inserted into the magnetic disc clamp holes 25. The assembly also provides the advantage that it is not necessary to fit a boss for post-assembly machining, as is done conventionally, and the post-assembly machining operation is simplified.

Figure 3:
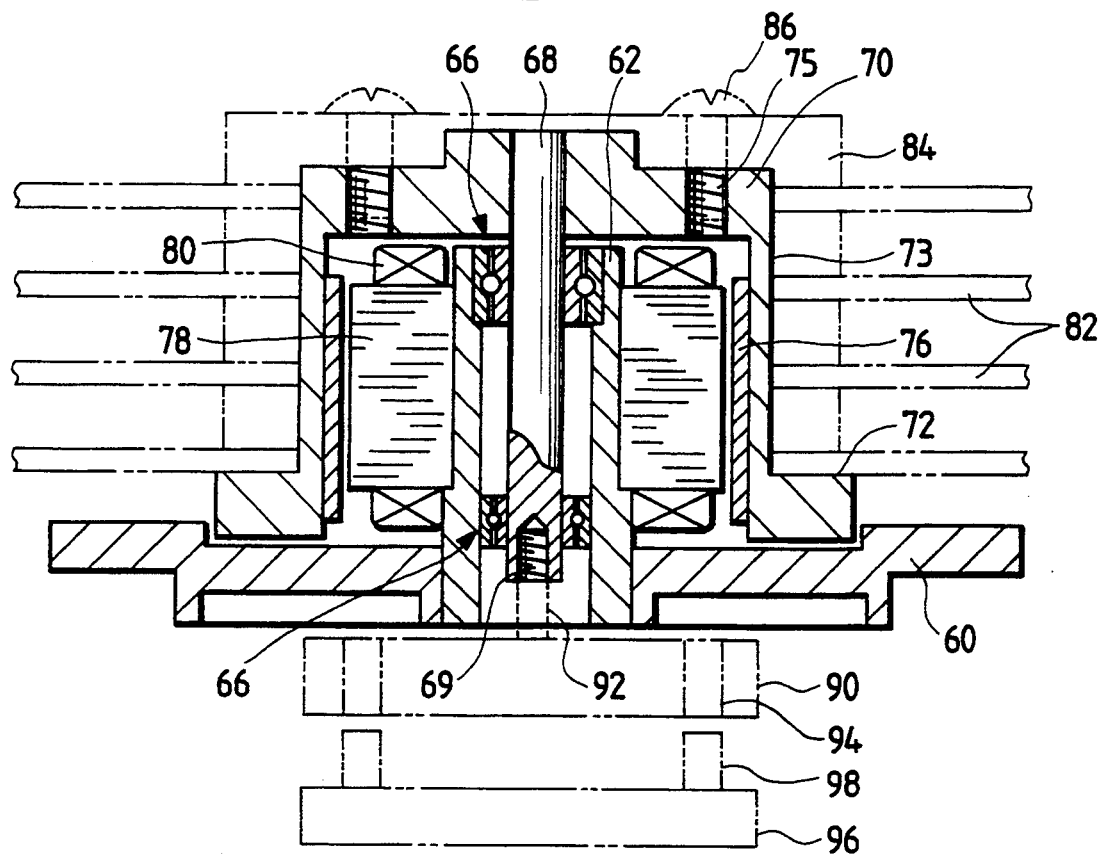
FIG. 3 is a cross-sectional view of a conventional magnetic disc drive device.
Figure 4:
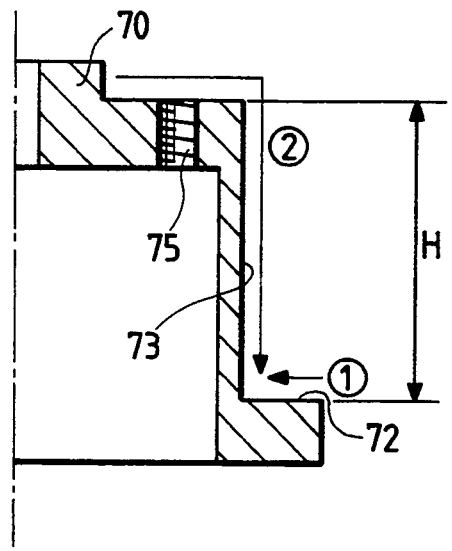
FIG. 4 is a cross-sectional view of the part of the conventional device of FIG. 3.

In the preferred embodiment shown in FIG. 1, the motor is a fixed-shaft type motor in which the hub rotates about the fixed shaft 12. However, this invention can also be applied to a rotating-shaft type motor in which the shaft rotates together with the hub, as shown in FIG. 3. The magnetic disc clamp holes can be threaded or unthreaded holes.

In this invention, because a projecting portion which projects axially from the surface of the hub is formed in the end surface of the hub around the outside of the magnetic disc clamp holes formed in the hub, when post-assembly machining is carried out, only the projecting portion of the end surface of the hub needs to be machined. It is not necessary to machine the area around the magnetic disc clamping holes. As a result, waste produced during machining does not readily enter the magnetic disc clamping holes, and problems such as waste later getting into the motor section or getting scattered over the magnetic discs are alleviated.

During post-assembly machining, because it is only necessary to machine the projecting portion formed on the end surface of the hub on the outer side of the threaded magnetic disc clamp holes, post-assembly machining can be carried out with the hub being rotated with the pins of a rotating member inserted into the threaded magnetic disc clamp holes, it is not necessary to fit a boss for post-assembly machining, as is done conventionally, and the post-assembly machining operation can be simplified.

What is claimed is:

1. A magnetic disc drive device comprising:
   a cylindrical hub which rotates with a plurality of magnetic discs, the cylindrical hub having disc clamp holes defined in an end surface thereof and a flange on which said magnetic discs are positioned;
   a motor for rotating said cylindrical hub;
   at least one spacer, disposed between said magnetic discs, for separating said magnetic discs from each other;
   a projecting member, formed between the disc clamp holes and the magnetic discs to be clamped, extending in the axial direction of the hub on an outer edge of said end surface of the hub, an upper surface of said projecting member being the only portion of the end surface of the hub that is machined during post-assembly machining; and
   a clamper clamped on said upper surface of said projecting member, said clamper exerting clamping force on said plurality of magnetic discs
   wherein the projecting member has a mounting reference surface for said clamper clamping the magnetic discs, said clamper contacting said mounting reference surface when said plurality of magnetic discs are clamped.

2. The magnetic disc drive device as claimed in claim 1, said motor comprising:
   a rotor being provided with a drive magnet, the rotor being mounted inside the cylindrical hub; and
   a stator mounted so as to face the drive magnet.

3. The magnetic disc drive device as claimed in claim 1, wherein a height differential is provided between said upper surface of said projecting member and an upper surface of one of said magnetic discs and said at least one spacer, said height differential controlling a clamping force exerted on said magnetic discs by said clamper.

4. The magnetic disc drive device as claimed in claim 1, wherein the projecting member is formed in the whole peripheral surface of the cylindrical hub.

* * * * *